US012633463B2

(12) United States Patent
Han et al.

(10) Patent No.: US 12,633,463 B2
(45) Date of Patent: May 19, 2026

(54) BUS CAPACITOR OF AN ELECTRONIC DEVICE, AND AUTOMOBILE HAVING SAME

(71) Applicant: BYD COMPANY LIMITED, Shenzhen (CN)

(72) Inventors: Bing Han, Shenzhen (CN); Alain Yves Louis, Shenzhen (CN); Yongbin He, Shenzhen (CN); Ruixing He, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 107 days.

(21) Appl. No.: 18/526,963

(22) Filed: Dec. 1, 2023

(65) Prior Publication Data

US 2024/0096555 A1    Mar. 21, 2024

Related U.S. Application Data

(63) Continuation of application No. PCT/CN2022/109057, filed on Jul. 29, 2022.

(30) Foreign Application Priority Data

Aug. 17, 2021    (CN) .......................... 202110945614.7

(51) Int. Cl.
*H01G 4/232*        (2006.01)
*H01G 2/04*         (2006.01)
(Continued)

(52) U.S. Cl.
CPC .............. *H01G 4/232* (2013.01); *H01G 2/04* (2013.01); *H01G 4/012* (2013.01); *H01G 4/242* (2013.01)

(58) Field of Classification Search
None
See application file for complete search history.

(56) References Cited

U.S. PATENT DOCUMENTS

| | | | | |
|---|---|---|---|---|
| 1,537,660 A | * | 5/1925 | Dubilier ................. | H01G 4/232 |
| | | | | 361/307 |
| 1,671,148 A | * | 5/1928 | Deutschmann .......... | H01G 4/30 |
| | | | | 361/326 |

(Continued)

FOREIGN PATENT DOCUMENTS

| | | |
|---|---|---|
| CN | 1484840 A | 3/2004 |
| CN | 1993012 A | 7/2007 |

(Continued)

OTHER PUBLICATIONS

International Search Report and Written Opinion for Application No. PCT/CN2022/109057, mailed on Sep. 27, 2022, 8 pages.

*Primary Examiner* — Eric W Thomas
(74) *Attorney, Agent, or Firm* — Sheppard Mullin Richter & Hampton LLP

(57) ABSTRACT

A bus capacitor includes: multiple capacitor layers stacked along a thickness direction of the bus capacitor, a dielectric being filled between two adjacent capacitor layers; the multiple capacitor layers including multiple positive capacitor layers and multiple negative capacitor layers; a first hole extending along the thickness direction, the first hole running through the multiple positive capacitor layers, a first conductive member disposed in the first hole, and the first conductive member being in contact with the multiple positive capacitor layers to electrically connect the multiple positive capacitor layers with each other; a second hole extending along the thickness direction, the second hole running through the multiple negative capacitor layers, a second conductive member disposed in the second hole, and the second conductive member being in contact with the (Continued)

1000 multiple negative capacitor layers to electrically connect the multiple negative capacitor layers with each other.

19 Claims, 11 Drawing Sheets

(51) Int. Cl.
  H01G 4/012 (2006.01)
  H01G 4/242 (2006.01)

(56) References Cited

U.S. PATENT DOCUMENTS

| | | | | |
|---|---|---|---|---|
| 3,278,815 A | * | 10/1966 | Booe | H01G 4/1209 |
| | | | | 106/286.6 |
| 2002/0085334 A1 | | 7/2002 | Figueroa et al. | |
| 2007/0117338 A1 | | 5/2007 | Yamamoto et al. | |
| 2008/0251285 A1 | | 10/2008 | Sato et al. | |
| 2011/0094075 A1 | * | 4/2011 | Lee | H02M 1/44 |
| | | | | 29/25.41 |
| 2015/0213952 A1 | | 7/2015 | Horowy et al. | |
| 2016/0254093 A1 | * | 9/2016 | Baechle | H01G 4/232 |
| | | | | 361/301.4 |
| 2019/0385796 A1 | * | 12/2019 | Hopwood | H01G 4/30 |
| 2020/0235557 A1 | | 7/2020 | She et al. | |
| 2022/0189689 A1 | * | 6/2022 | Pyo | H01G 4/005 |

FOREIGN PATENT DOCUMENTS

| | | | |
|---|---|---|---|
| CN | 205490096 U | 8/2016 | |
| CN | 206834220 U | 1/2018 | |
| CN | 209375438 U | 9/2019 | |
| CN | 210137281 U | 3/2020 | |
| CN | 112701878 A | 4/2021 | |
| JP | H08-298228 A | 11/1996 | |
| JP | 2004534376 A | 11/2004 | |
| JP | 2007335685 A | 12/2007 | |
| KR | 2003-0064887 A | 8/2003 | |
| KR | 2010-0129711 A | 12/2010 | |
| KR | 2011-0135233 A | 12/2011 | |
| WO | 2002054421 A2 | 7/2002 | |

* cited by examiner

1000

1000

BUS CAPACITOR OF AN ELECTRONIC DEVICE, AND AUTOMOBILE HAVING SAME

CROSS-REFERENCE TO RELATED APPLICATIONS

This application is a Continuation Application of International Patent Application No. PCT/CN2022/109057, filed on Jul. 29, 2022, which is based on and claims priority to and benefits of Chinese Patent Application No. 202110945614.7, filed on Aug. 17, 2021. The entire content of all of the above applications is incorporated herein by reference.

FIELD

The present disclosure relates to a bus capacitor and an automobile having same.

BACKGROUND

The third generation semiconductor represented by silicon carbide (SiC) has excellent performance in the electronic control of new energy vehicles, and has advantages of a wide bandgap, a high thermal conductivity, a high melting point, a high critical breakdown electric field, a high saturation electron migration speed, and the like. A metal-oxide-semiconductor field-effect transistor (MOSFET) made from SiC has excellent properties such as a low on-resistance, a fast switch-on/off speed, a high-temperature resistance, and a high-voltage resistance.

In a motor drive power module of the new energy vehicle, an MOSFET device made from SiC serves as a switch device. This can reduce wear and tear, improve an endurance mileage (e.g., the maximum mileage that a vehicle can travel with a full charge) of the New European Driving Cycle (NEDC), reduce a volume, and increase space utilization. Currently, because a stray inductance of a system cannot be well controlled, in order to prevent an impact voltage caused by a stray inductance from damaging components during switching on/off, the impact of the stray inductance on the components can be alleviated only by reducing a switch-on/off speed. However, after the switch-on/off is reduced, the advantage of the fast switch-on/off speed of the MOSFET cannot be fully utilized. Particularly, the performance of SiC in the MOSFET devices cannot be fully utilized.

SUMMARY

The present disclosure provides a bus capacitor and an automobile, which can reduce a stray inductance, thereby relieving impact of the stray inductance on components, allowing an advantage of a fast switch-on/off speed of an MOSFET to be fully utilized, that is, allowing performance of SiC in an MOSFET device to be fully utilized.

A first aspect of the present disclosure provides a bus capacitor. The bus capacitor includes: multiple capacitor layers stacked along a thickness direction of the bus capacitor. A dielectric is filled between any two adjacent capacitor layers. The multiple capacitor layers include multiple positive capacitor layers and multiple negative capacitor layers. The bus capacitor includes a first hole extending along the thickness direction. The first hole runs through the multiple positive capacitor layers. A first conductive member is disposed in the first hole. The first conductive member is in contact with the multiple positive capacitor layers, to electrically connect the multiple positive capacitor layers with each other. The bus capacitor includes a second hole extending along the thickness direction. The second hole runs through the multiple negative capacitor layers. A second conductive member is disposed in the second hole. The second conductive member is in contact with the multiple negative capacitor layers, to electrically connect the multiple negative capacitor layers with each other.

In some embodiments, the first conductive member includes a first conductive rod disposed into the first hole. The second conductive member includes a second conductive rod disposed into the second hole.

In some embodiments, the first conductive member includes a first conductive layer coated on an inner wall of the first hole. The second conductive member includes a second conductive layer coated on an inner wall of the second hole.

In some embodiments, the multiple positive capacitor layers and the multiple negative capacitor layers are alternately stacked along the thickness direction. The first hole further runs through the negative capacitor layers. One of the negative capacitor layers is sandwiched between two adjacent positive capacitor layers. The first conductive member is isolated from the negative capacitor layers. The second hole further runs through the positive capacitor layers. One of the positive capacitor layer is sandwiched between two adjacent negative capacitor layers. The second conductive member is isolated from the positive capacitor layers.

In some embodiments, the bus capacitor includes multiple first holes extending along the thickness direction. The bus capacitor includes multiple second holes extending along the thickness direction. Multiple first conductive members including the first conductive member and disposed in the multiple first holes electrically connect the multiple positive capacitor layers at first locations. Multiple second conductive members including the second conductive member and disposed in the multiple second holes electrically connect the multiple negative capacitor layers at second locations.

In some embodiments, the multiple positive capacitor layers include a first positive electrode layer and a second positive electrode layer. A thickness of the first positive electrode layer is greater than a thickness of the second positive electrode layer. The multiple negative capacitor layers include a first negative electrode layer and a second negative electrode layer. A thickness of the first negative electrode layer is greater than a thickness of the second negative electrode layer.

In some embodiments, the bus capacitor further includes a positive input terminal, a negative input terminal, a positive output terminal, and a negative output terminal. The positive input terminal is in contact with the first positive electrode layer to electrically connect the positive input terminal to the first positive electrode layer. The negative input terminal is in contact with the first negative electrode layer to electrically connect the negative input terminal to the first negative electrode layer. The positive output terminal is in contact with the multiple positive capacitor layers to electrically connect the positive output terminal to the multiple positive capacitor layers. The negative output terminal is in contact with the multiple negative capacitor layers to electrically connect the negative output terminal to the multiple negative capacitor layers.

In some embodiments, the bus capacitor further includes an insulation housing. The multiple capacitor layers are disposed inside the insulation housing. The positive input terminal runs through the bus capacitor along the thickness direction. Two opposite ends of the positive input terminal along the thickness direction are exposed outside the insulation housing. The negative input terminal runs through the bus capacitor along the thickness direction. Two opposite ends of the negative input terminal along the thickness direction are exposed outside the insulation housing. A positive input hole runs through the positive input terminal along the thickness direction. A negative input hole runs through the negative input terminal along the thickness direction.

In some embodiments, the bus capacitor further includes an insulation housing. The multiple capacitor layers are disposed inside the insulation housing. The positive output terminal runs through the bus capacitor along the thickness direction. Two opposite ends of the positive output terminal along the thickness direction are exposed outside the insulation housing. The negative output terminal runs through the bus capacitor along the thickness direction. Two opposite ends of the negative output terminal along the thickness direction are exposed outside the insulation housing. A positive output hole runs through the positive output terminal along the thickness direction. A negative output hole runs through the negative output terminal along the thickness direction.

In some embodiments, the bus capacitor further includes an insulation housing. The multiple capacitor layers are disposed inside the insulation housing. The positive output terminal is in a shape of a first curved sheet. The negative output terminal is in a shape of a second curved sheet. Amounting hole runs through the bus capacitor along the thickness direction thereof. Both the positive output terminal and the negative output terminal are disposed inside the mounting hole.

In some embodiments, a connection line between the positive input terminal and the positive output terminal intersects a connection line between the negative input terminal and the negative output terminal.

In some embodiments, the multiple positive capacitor layers include multiple second positive electrode layers. The multiple negative capacitor layers include multiple second negative electrode layers. A number of the second positive electrode layers is equal to a number of the second negative electrode layers.

In some embodiments, the bus capacitor further includes a positive input terminal and a negative input terminal. The positive input terminal is electrically connected to the first positive electrode layer and the second positive electrode layer. The negative input terminal is electrically connected to the first negative electrode layer and the second negative electrode layer.

A second aspect of the present disclosure provides an automobile. The automobile includes: the bus capacitor according to the first aspect of the present disclosure and a power module. The power module includes a positive connection terminal and a negative connection terminal. The positive connection terminal is connected to the positive capacitor layers of the bus capacitor. The negative connection terminal is connected to the negative capacitor layers of the bus capacitor.

According to the bus capacitor provided in the present disclosure, multiple positive capacitor layers of the bus capacitor may be electrically connected through the first conductive member provided/disposed in the first hole extending along the thickness direction of the bus capacitor and running through the multiple positive capacitor layers, and multiple negative capacitor layers of the bus capacitor may be electrically connected through the second conductive member provided in the second hole extending along the thickness direction of the bus capacitor and running through the multiple negative capacitor layers. In this way, when the power module is connected to the bus capacitor through the positive output terminal and the negative output terminal, a connection distance between each positive capacitor layer and the power module is greatly shortened; and a connection distance between each negative capacitor layer and the power module is also greatly shortened.

Details of one or more embodiments of the present disclosure are provided in the accompanying drawings and descriptions below. Other features and advantages of the present disclosure become obvious with reference to the specification, the accompanying drawings, and the claims.

BRIEF DESCRIPTION OF THE DRAWINGS

To describe the technical solutions in the present disclosure more clearly, the following briefly introduces the accompanying drawings required in the implementations.

Figure 1:
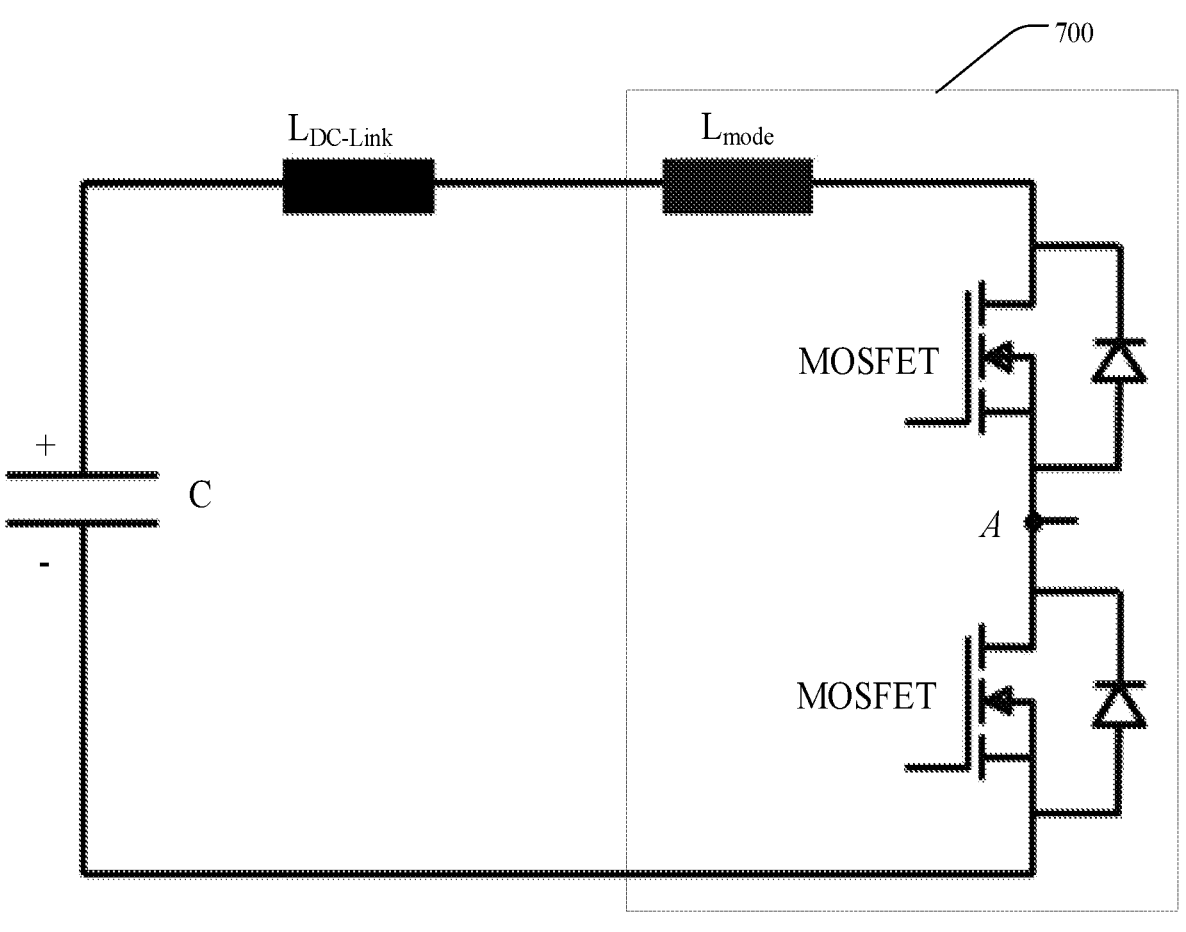
FIG. 1 is a schematic diagram of the principle of generating a stray inductance.

Description of reference numerals: 1000: bus capacitor, 100: positive capacitor layer, 110: first positive electrode layer, 120: second positive electrode layer, 200: negative capacitor layer, 210: first negative electrode layer, 220: second negative electrode layer, 300: dielectric, 400: first conductive member, 401: first hole, 402: first conductive rod, 403: first conductive layer, 410: second conductive member, 411: second hole, 412: second conductive rod, 413: second conductive layer, 500: positive input terminal, 501: positive input hole, 510: negative input terminal, 511: negative input hole, 520, 520a: positive output terminal, 521: positive output hole, 530, 530a: negative output terminal, 531: negative output hole, 600: insulation housing, 700: power module, 710, 710a: positive connection terminal, 720, 720a: negative connection terminal, 730: conductive fastening rod, 800: mounting hole, 2000: automobile.

DETAILED DESCRIPTION

The following clearly and completely describes the technical solutions in the embodiments of the present disclosure with reference to the accompanying drawings in the embodiments of the present disclosure.

In this specification and the claims of the present disclosure, the terms "first", "second", and so on are intended to distinguish similar objects, but do not necessarily indicate a order or sequence. It should be understood that the data termed in such a way is interchangeable in proper circumstances, so that the embodiments of the present disclosure can be implemented in other sequences than the sequence illustrated or described herein. In addition, the objects distinguished by "first", "second", and the like are usually of one type, and there is no limitation on quantities of the objects. For example, there may be one or more first objects.

In the present disclosure, unless otherwise explicitly specified or defined, the terms such as "connect" should be understood in a broad sense. For example, the connection may be a fixed connection, a detachable connection, or an integral connection; or the connection may be a mechanical connection or an electrical connection; or the connection may be a direct connection, an indirect connection through an intermediary, internal communication between two components, or an interaction relationship between two components. A person of ordinary skill in the art may understand the meanings of the foregoing terms in the present disclosure according to situations.

In the present disclosure, unless otherwise explicitly specified or defined, the first feature being located "above" or "below" the second feature may be the first feature being in a direct contact with the second feature, or the first feature being in an indirect contact with the second feature through an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

FIG. 1 is a schematic diagram of the principle of generating a stray inductance. The stray inductance includes two parts. One part is a stray inductance generated by a copper bar between a bus capacitor C and a terminal of a power module 700. This part of stray inductance is represented by $L_{DC-Link}$ in FIG. 1. The other part is an internal inductance of the power module and represented by $L_{mode}$ in FIG. 1. It can be understood that, the power module as a whole is a direct current to alternating current (DC-AC) conversion module, such as a DC-AC converter. Two MOSFET devices are provided in the power module. A node A between the two MOSFETs is an output terminal of the power module. Generally, in FIG. 1, an upper MOSFET device is connected to a positive electrode of the capacitor C after being turned on, a lower MOSFET device is connected to a negative electrode of the capacitor C after being turned on, and the upper MOSFET and the lower MOSFET are alternately turned on, thereby converting DC to AC.

Figure 2:
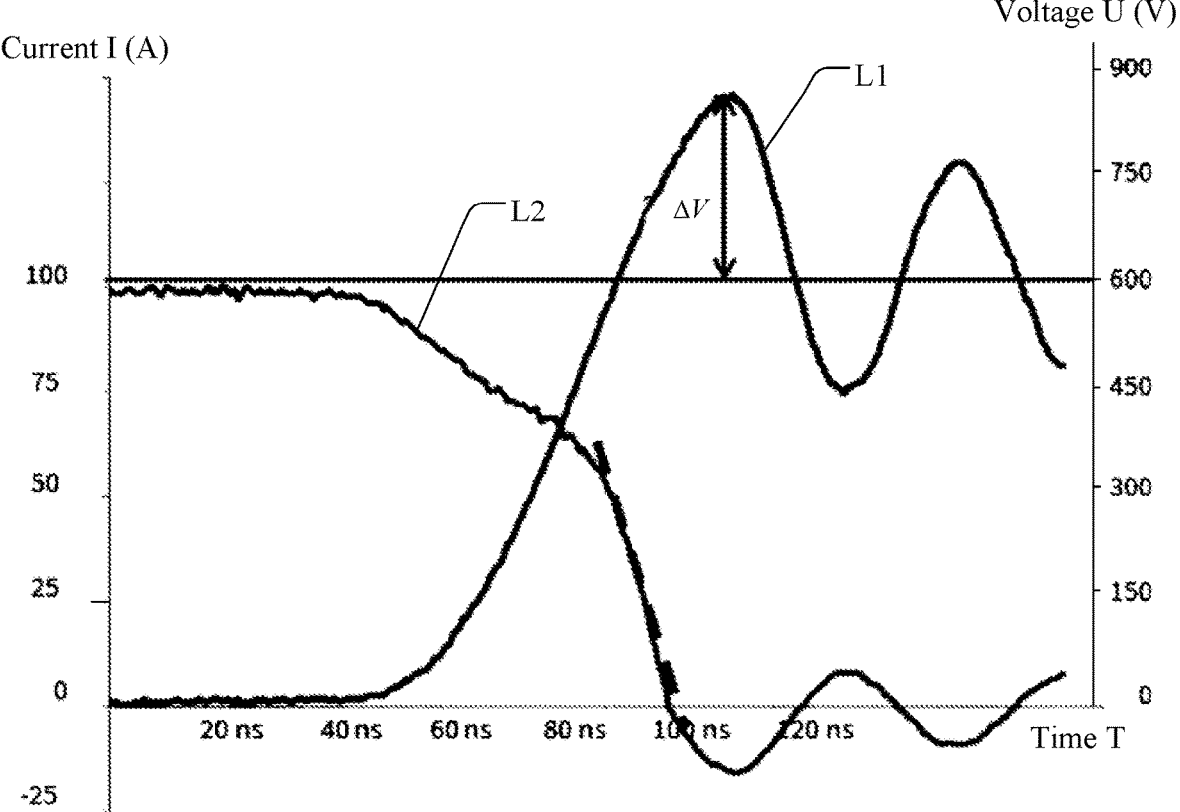
FIG. 2 is a schematic diagram of voltage overshoot caused by a stray inductance.

FIG. 2 is a schematic diagram of voltage overshoot caused by a stray inductance. In FIG. 2, a left longitudinal axis represents a current I, in amperes (A); a right longitudinal axis represents a voltage U, in volts (V); and a lateral axis represents a time T, in nanoseconds (ns). A curve L1 is a voltage change representation, and a curve L2 is a current change representation. It can be seen from FIG. 2 that, after power is off, an instantaneous impulse voltage is $\Delta V$, where $\Delta V$ is calculated by using the following formula 1:

$$\Delta V = (L_{DC-Link} + L_{mode}) * (di/dt)$$

In formula 1, $\Delta V$ is the instantaneous impulse voltage when the MOSFET device is turned off, $L_{DC-Link}$ is the stray inductance generated by the copper bar between the bus capacitor C and the terminal of the power module, $L_{mode}$ is the internal inductance of the power module, and (di/dt) is a switch-on/off speed of the MOSFET device. It can be seen from formula 1 that, when the stray inductance $L_{mode}$ remains unchanged, a larger stray inductance $L_{DC-Link}$ indicates a larger instantaneous impulse voltage $\Delta V$. If the stray inductance $L_{DC-Link}$ cannot be reduced, in order to prevent the instantaneous impulse voltage $\Delta V$ from being too large, the switch-on/off speed (di/dt) of the MOSFET device needs to be controlled to be reduced.

However, reducing the switch-on/off speed of the MOSFET device hinders the full exertion of the advantage of the MOSFET device (that is, the fast switch-on/off speed). Particularly, the performance of SiC in the MOSFET device cannot be fully utilized.

To resolve the foregoing problem, an embodiment of the present disclosure provides a bus capacitor. The bus capacitor can be used in an electronic control module of an automobile. The electronic control module may be a motor controller. It can be understood that, the bus capacitor is generally used in cooperation with a power module 700 (such as a power chip, including an IGBT, a SiC MOSFET, or a Si MOSFET).

Figure 3:
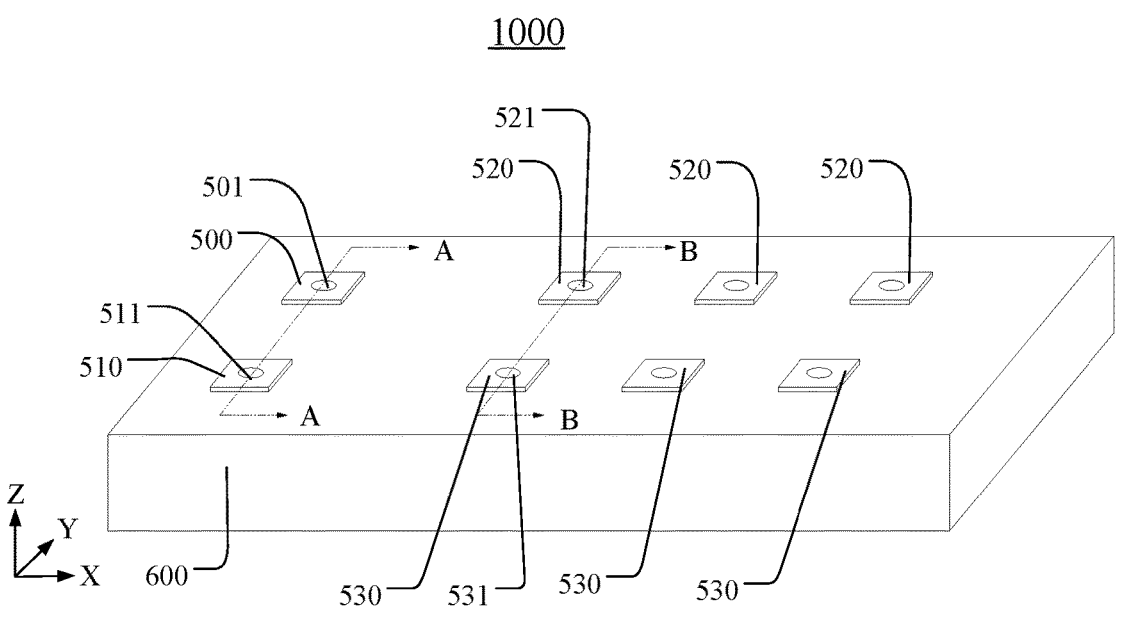
FIG. 3 is a schematic structural diagram of a bus capacitor according to an embodiment of the present disclosure.
Figure 4:
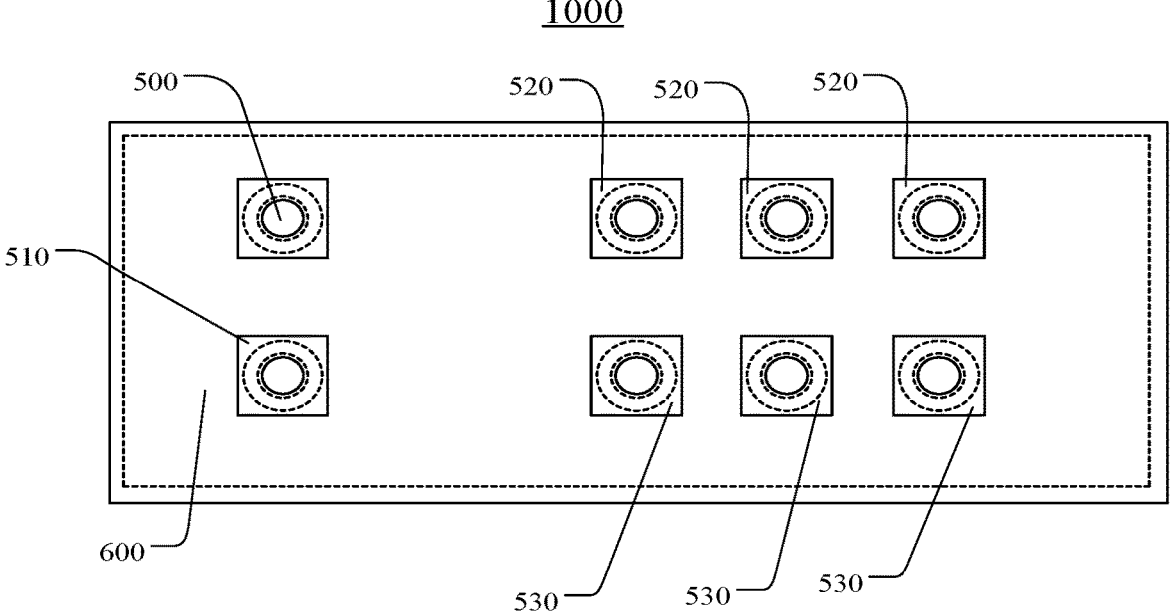
FIG. 4 is a schematic structural diagram of the bus capacitor shown in FIG. 3 from another perspective.
Figure 5:
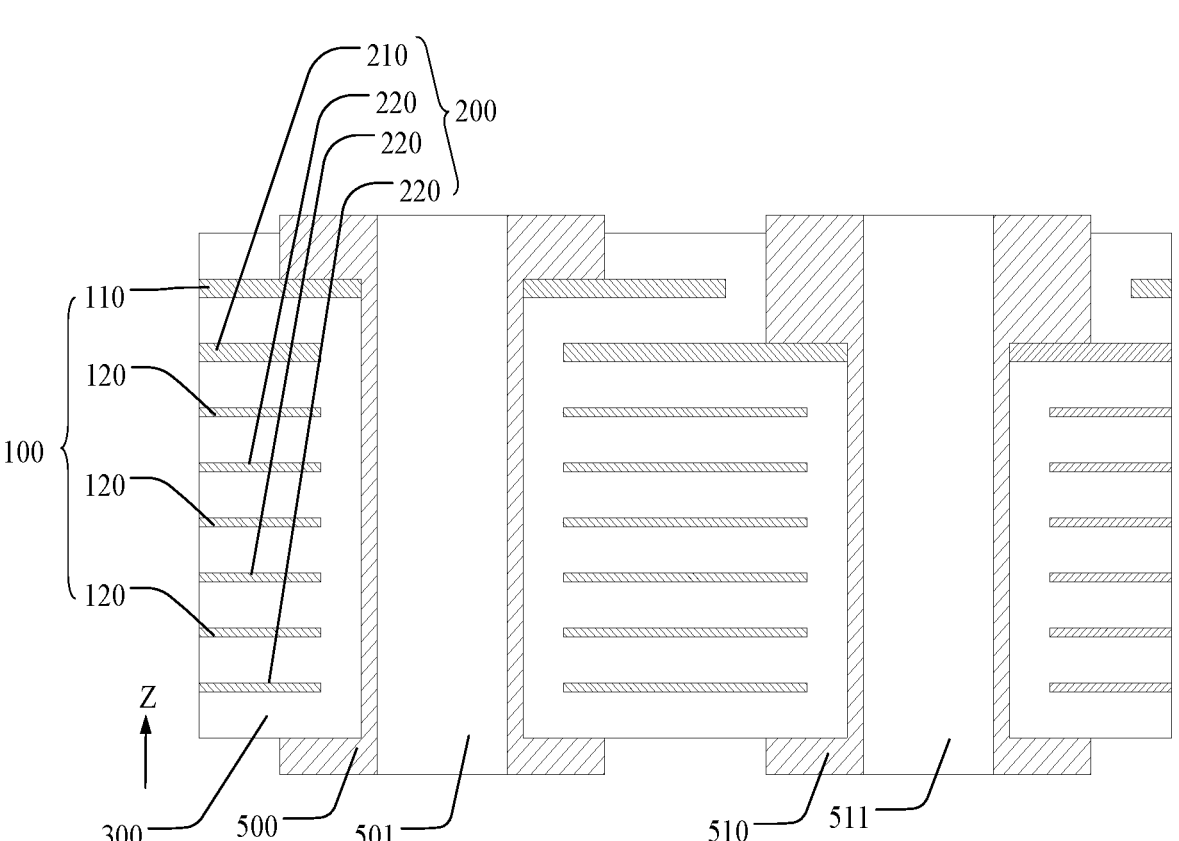
FIG. 5 is a cross-sectional view of the bus capacitor along line A-A in FIG. 3.
Figure 6:
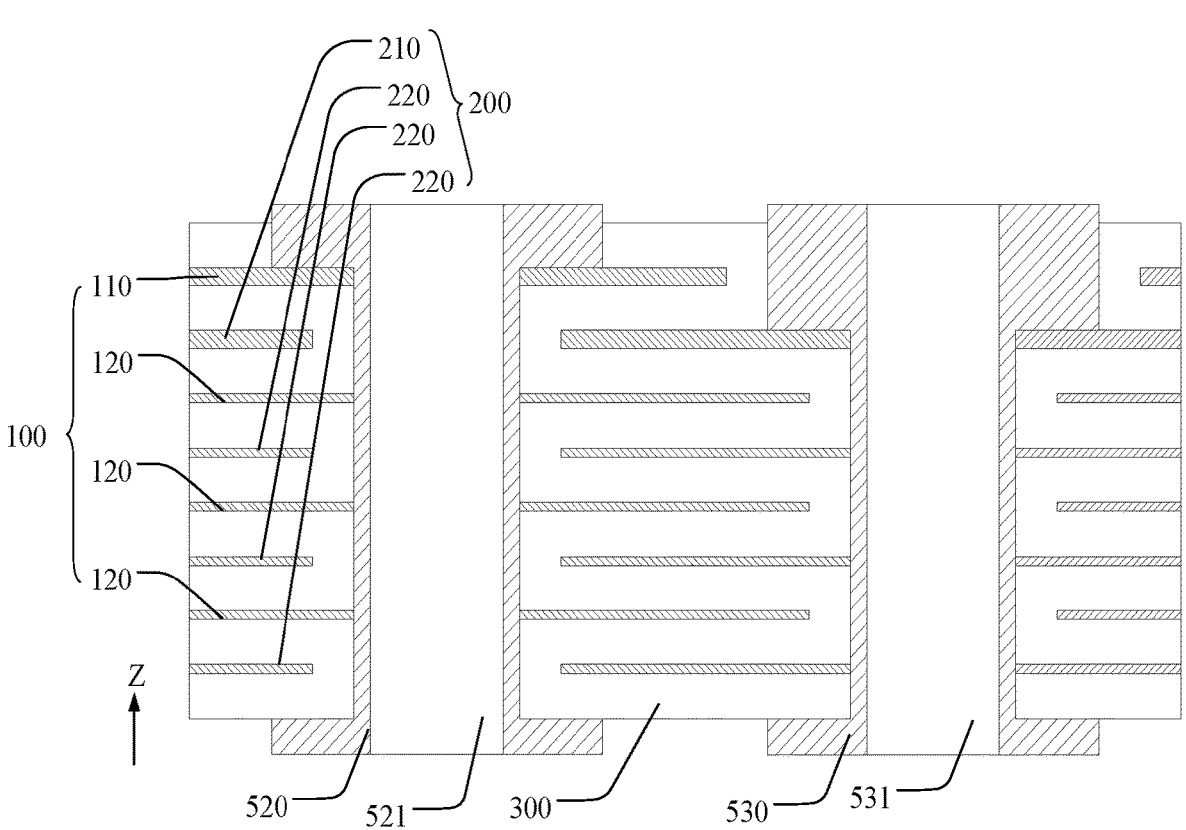
FIG. 6 is a cross-sectional view of the bus capacitor along line B-B in FIG. 3.
Figure 8:
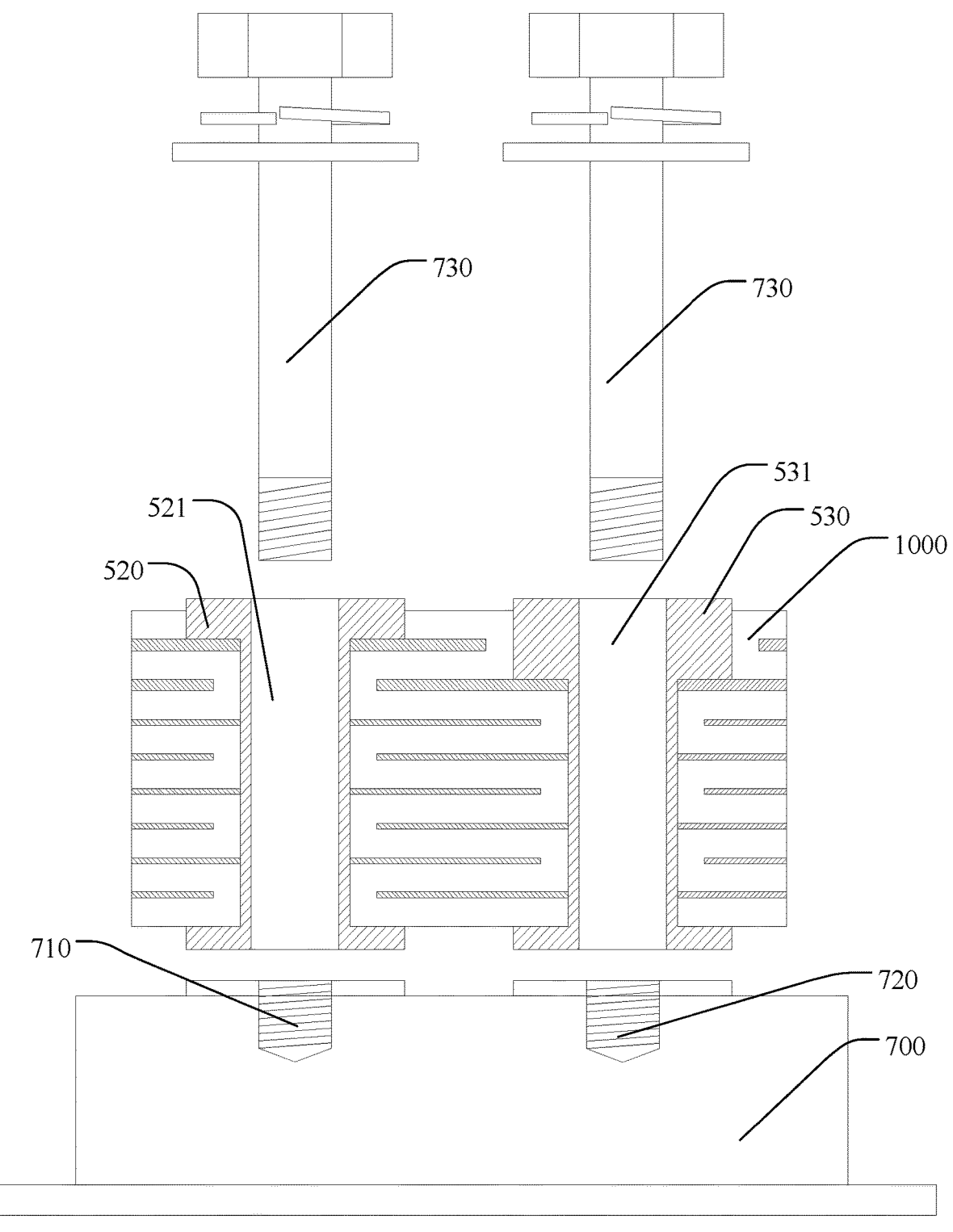
FIG. 8 is a schematic structural diagram of cooperation between the bus capacitor and a power module.

Refer to FIG. 3 to FIG. 6, and FIG. 8. FIG. 3 is a schematic structural diagram of a bus capacitor according to an embodiment of the present disclosure. FIG. 4 is a schematic structural diagram of the bus capacitor shown in FIG. 3 from another perspective. FIG. 5 is a cross-sectional view of the bus capacitor along line A-A in FIG. 3. FIG. 6 is a cross-sectional view of the bus capacitor along line B-B in FIG. 3. FIG. 8 is a schematic structural diagram of cooperation between the bus capacitor and a power module. The bus capacitor provided in an embodiment of the present disclosure includes: an insulation housing 600, multiple capacitor layers, and a dielectric 300. Both the multiple capacitor layers and the dielectric 300 are located inside the insulation housing 600. The multiple capacitor layers are stacked along a thickness direction (that is, a Z-axis direction) of the bus capacitor, and the dielectric 300 is filled between every two adjacent capacitor layers.

The insulation housing 600 may be made of plastics. The dielectric 300 may be any one of mica, ceramics, and an organic film. The insulation housing 600 has a function of protecting the capacitor layers and the dielectric 300, preventing the capacitor layers and the dielectric 300 from getting damp, and so on. The insulation housing 600 may be made into a cylindrical shape, a rectangular parallelepiped shape, a cube shape, an elliptical cylinder shape, and the like according to actual needs. This is not limited in the present disclosure.

A person skilled in the art needs to understand that the bus capacitor ultimately needs to be connected to the power module 700, and therefore, the bus capacitor may further include terminals. In an embodiment, the bus capacitor further includes a positive input terminal 500, a negative input terminal 510, a positive output terminal 520, and a negative output terminal 530. The positive input terminal 500 and the negative input terminal 510 serve as input ports for electric energy, and are usually connected to a power supply point inside a controller through a copper bar. The positive output terminal 520 and the negative output terminal 530 are respectively connected to a positive connection terminal and a negative connection terminal of the power module 700.

It should be understood that, in this embodiment, positive capacitor layers connected to the positive input terminal and the positive output terminal are a same positive capacitor layer, but the positive input terminal and the positive output terminal are connected to different parts of the positive capacitor layer, so that the positive capacitor layer also has an electric energy transmission function. Similarly, the negative input terminal and the negative output terminal are connected to different parts of a same negative capacitor layer, so that the negative capacitor layer also has an electric energy transmission function.

In this embodiment, multiple groups of output terminals may be set. As shown in the figure, three groups of output terminals may be set, and each group of output terminals include one positive output terminal 520 and one negative output terminal 530. Each group of output terminals may be correspondingly connected to one power module 700.

In some implementations, the positive input terminal 500 and the positive output terminals 520 are distributed/disposed in a row, and the negative input terminal 510 and the negative output terminals 530 are distributed/disposed in a row, to facilitate the arrangement/configuration.

In some implementations, the positive input terminal 500 and the positive output terminal 520 are diagonally distributed, and the negative input terminal 510 and the negative output terminal 530 are diagonally distributed. A connection line between the positive input terminal 500 and the positive output terminal 520 intersects a connection line between the negative input terminal 510 and the negative output terminal 530. In this way, positive and negative currents may be cross-distributed, thereby reducing the inductance.

In the internal connection, the positive input terminal 500 and the positive output terminal 520 are connected to the positive capacitor layer 100, and the negative input terminal 510 and the negative output terminal 530 are connected to the negative capacitor layer 200.

In an embodiment, the multiple capacitor layers include multiple positive capacitor layers 100 and multiple negative capacitor layers 200. Particularly, the multiple positive capacitor layers 100 include a first positive electrode layer 110 and a second positive electrode layer 120. A thickness of the first positive electrode layer 110 is greater than a thickness of the second positive electrode layer 120. The multiple negative capacitor layers 200 include a first negative electrode layer 210 and a second negative electrode layer 220. A thickness of the first negative electrode layer 210 is greater than a thickness of the second negative electrode layer 220.

In some implementations, the positive input terminal 500 is configured to be in contact with the first positive electrode layer 110, to enable the positive input terminal 500 to be electrically connected to the first positive electrode layer 110. The negative input terminal 510 is configured to be in contact with the first negative electrode layer 210 to enable the negative input terminal 510 to be electrically connected to the first negative electrode layer 210.

The positive output terminal 520 is configured to be in contact with the multiple positive capacitor layers 100 to enable the positive output terminal 520 to be electrically connected to the multiple positive capacitor layers 100, that is, to enable both the first positive electrode layer 110 and the second positive electrode layer 120 to be connected to the positive output terminal 520. The negative output terminal 530 is configured to be connected to the multiple negative capacitor layers 200 to enable the negative output terminal 530 to be electrically connected to the multiple negative capacitor layers 200, that is, to enable both the first negative electrode layer 210 and the second negative electrode layer 220 to be connected to the negative output terminal 530.

That is, the positive input terminal 500 is connected to the first positive electrode layer 110, the negative input terminal 510 is connected to the first negative electrode layer 210, the positive output terminal 520 is connected to both the first positive electrode layer 110 and the second positive electrode layer 120, and the negative output terminal 530 is connected to both the first negative electrode layer 210 and the second negative electrode layer 220. In this case, a load current may be transmitted between the first positive electrode layer 110 and the first negative electrode layer 210, while the second positive electrode layer 120 and the second negative electrode layer 220 allows a ripple current to flow through, without participating in the transmission of the load current.

Generally, the load current is far greater than the ripple current. Therefore, the first positive electrode layer 110 and the first negative electrode layer 210 are set relatively thick and can well transmit the load current. The second positive electrode layer 120 and the second negative electrode layer 220 are set relatively thin, so that resources can be saved, a thickness of the bus capacitor can be reduced, and the ripple current can well flow through.

In this embodiment, the first positive electrode layer 110 and the first negative electrode layer 210 are mainly responsible for transmitting a current, and their thicknesses and quantities of layers may be designed according to a load current that actually needs to be transmitted. In terms of the second positive electrode layer 120 and the second negative electrode layer 220 that serve as parts providing a main capacitance value, multiple layers of second positive electrode layers 120 and multiple layers of second negative electrode layers 220 may be set to meet a capacitance requirement.

In some implementations, the positive input terminal 500 may alternatively be set to be connected not only to the first positive electrode layer 110, but also to the second positive electrode layer 120. Correspondingly, the negative input terminal 510 is configured to be connected not only to the first negative electrode layer 210, but also to the second negative electrode layer 220. In this way, the positive input terminal 500 and the negative input terminal 510 may also participate in transmitting the load current, thereby increasing the load of the bus capacitor.

Regardless of the connection method, the first positive electrode layers 110 and the first negative electrode layers 210 have equal quantities of layers, and both can be set to be one layer or at least two layers. The second positive electrode layers 120 and the second negative electrode layers 220 have equal quantities of layers, and both can be set to be one layer or at least two layers.

It can be understood that, the multiple capacitor layers may be stacked in any manner. For example, the first positive electrode layer 110 and the first negative electrode layer 210 are provided on the topmost layer or the bottom layer; and the first positive electrode layer 110 and the first negative electrode layer 210 are provided on intermediate layers; and so on. Some types are listed as follows. First type: stacked from top to bottom are sequentially the first positive electrode layer 110, the first negative electrode layer 210, the second positive electrode layer 120, the second negative electrode layer 220, the second positive electrode layer 120, the second negative electrode layer 220, the second positive electrode layer 120, and the second negative electrode layer 220. Second type: stacked from top to bottom are sequentially the first negative electrode layer 210, the first positive electrode layer 110, the second positive electrode layer 120, the second negative electrode layer 220, the second positive electrode layer 120, the second negative electrode layer 220, the second positive electrode layer 120, and the second negative electrode layer 220. Third type: the first positive electrode layer 110, the first negative electrode layer 210, the first positive electrode layer 110, the first negative electrode layer 210, the second positive electrode layer 120, the second negative electrode layer 220, the second positive electrode layer 120, and the second negative electrode layer 220. Fourth type: stacked from top to bottom are sequentially the first positive electrode layer 110, the first negative electrode layer 210, the second positive electrode layer 120, the second positive electrode layer 120, the second negative electrode layer 220, the second negative electrode layer 220, the second positive electrode layer 120, and the second negative electrode layer 220. A few types are listed above, and other similar methods are not enumerated.

The thicknesses and quantities of layers of the first positive electrode layers 110, the first negative electrode layers 210, the second positive electrode layers 120, and the second negative electrode layers 220 may all be set according to actual needs, which are not limited in the present disclosure.

Figure 7:
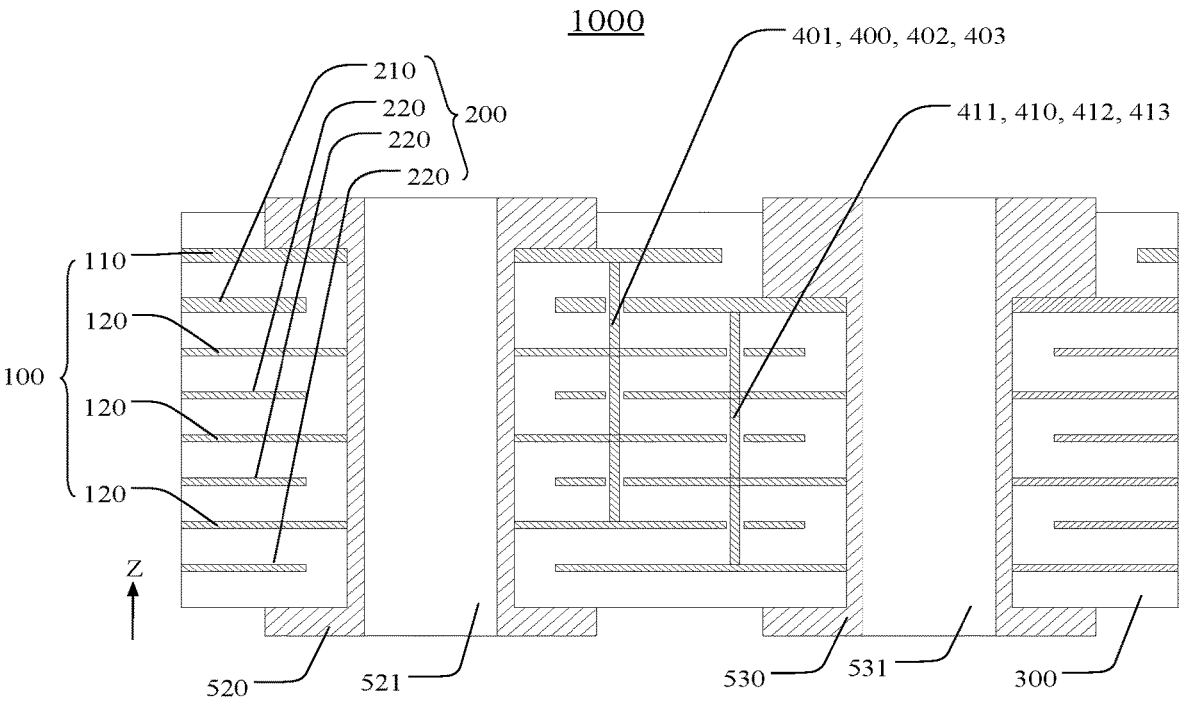
FIG. 7 is a schematic structural diagram of the bus capacitor provided with a first conductive member and a second conductive member shown in FIG. 3.

FIG. 7 is a schematic structural diagram of the bus capacitor provided with a first conductive member and a second conductive member shown in FIG. 3. In this embodiment, in order to reduce the stray inductance, the bus capacitor is provided with a first hole extending along the thickness direction thereof. The first hole runs through the multiple positive capacitor layers 100. A first conductive member 400 is provided/disposed in the first hole. The first conductive member 400 is in contact with the multiple positive capacitor layers 100, to enable the multiple positive capacitor layers 100 to be electrically connected. The bus capacitor is provided with a second hole extending along the thickness direction thereof. The second hole runs through the multiple negative capacitor layers 200. A second conductive member 410 is provided in the second hole. The second conductive member 410 is in contact with the multiple negative capacitor layers 200, to enable the multiple negative capacitor layers 200 to be electrically connected.

It can be learned that, in this embodiment, the multiple positive capacitor layers 100 may be electrically connected through the first conductive member 400, and the multiple negative capacitor layers 200 may be electrically connected through the second conductive member 410. In this way, when the power module 700 is connected to the bus capacitor through the positive output terminal 520 and the negative output terminal 530, a connection distance between each of the positive capacitor layers 100 and the power module 700 is greatly reduced; and a connection distance between each of the negative capacitor layers 200 and the power module 700 is greatly reduced. Compared with the conventional method of using a copper bar or a connection line, in the present disclosure, the distance between the bus capacitor and each of the positive output terminal 520 and the negative output terminal 530 is greatly reduced. This can reduce the stray inductance, and relieve impact of the stray inductance on components, thereby allowing an advantage of a fast switch-on/off speed of an MOSFET to be fully utilized, that is, allowing performance of SiC in an MOSFET device to be fully utilized.

In addition, the capacitor layer may have some resistances, which may cause loss of the transmitted electric energy. Therefore, setting the multiple positive capacitor layers 100 to be electrically connected through the first conductive member 400 and setting the multiple negative capacitor layers 200 to be electrically connected through the second conductive member 410 can further reduce an equivalent series resistance. In an embodiment, when electric energy is transmitted between relatively thin capacitor layers, resistances of the relatively thin capacitor layers are relatively large, which may cause great loss to the transmitted electric energy. In this case, the first conductive member 400 connects a thinner second positive electrode layer 120 and a thicker first positive electrode layer 110, and the second conductive member 410 connects a thinner second negative electrode layer 220 and a thicker second positive electrode layer 120. In this way, when a current is transmitted through the thinner second positive electrode layer 120 and second negative electrode layer 220, part of the current is shunted to the thicker first positive electrode layer 110 and first negative electrode layer 210 for transmission. Because the thicker first positive electrode layer 110 and first negative electrode layer 210 have smaller resistances, the loss during transmission of electric energy is also smaller, which is equivalent to reducing an equivalent series resistance during the transmission of the electric energy.

For example, there may be one or at least two first conductive members 400, and multiple first conductive members 400 may be distributed/disposed at different positions (e.g., first locations) to connect different parts of the multiple positive capacitor layers 100. In this way, the equivalent resistance of each part of the thinner positive capacitor layer 100 can be effectively reduced. Similarly, there may be one or at least two second conductive members 410, and multiple second conductive members 410 may be distributed at different positions (e.g., second locations) to connect different parts of the multiple negative capacitor layers 200. In this way, the equivalent resistance of each part of the thinner negative capacitor layer 200 can be effectively reduced.

Multiple manners may be used for the first conductive member 400 and second conductive member 410. In some implementations, the first conductive member 400 includes a first conductive rod 402 inserted/disposed into the first hole 401. The second conductive member 410 includes a second conductive rod 412 inserted/disposed into the second hole 411. The first conductive rod may be formed of a conductive liquid injected into the first hole, or may be prepared in advance from a conductive material and then inserted into the first hole, or may be made by using an electroless copper plating process. This is not limited in this embodiment. The second conductive rod may be formed similarly, and details are not described again. This type of first conductive member 400 and second conductive member 410 have strong electrical connection stability and are easy to process.

In some implementations, the first conductive member 400 includes a first conductive layer coated on an inner wall of the first hole, and the second conductive member 410 includes a second conductive layer coated on an inner wall of the second hole. That is, the conductive material is coated on the inner wall of the first hole to form the first conductive member 400, and the conductive material is coated on the inner wall of the second hole to form the second conductive member 410. In this way, the first conductive member 400 and the second conductive member 410 can have good electrical connection stability with fewer materials consumed and are easy to process, which is beneficial to the lightweight design of the bus capacitor.

As mentioned above, the multiple positive capacitor layers 100 and the multiple negative capacitor layers 200 may be alternately stacked along the thickness direction. In this case, when running through the positive capacitor layers 100, the first hole also runs through the negative capacitor layer 200 sandwiched between two adjacent positive capacitor layers 100. To prevent the first conductive member 400 in the first hole from coming into contact with the negative capacitor layer 200 and causing a short circuit, the first conductive member 400 may be isolated from the negative capacitor layer 200 through which the first hole runs. In an embodiment, a hole is formed at a position of the negative capacitor layer 200 through which the first hole runs. In this case, this hole may be set relatively large, that is, an aperture of this hole is greater than that of the first hole. In this way, the first conductive member 400 located in the first hole is isolated from the negative capacitor layer 200 (e.g., not in contact with the negative capacitor layer 200).

Similarly, the second hole further runs through the positive capacitor layer 100 sandwiched between any two adjacent negative capacitor layers 200. Therefore, to prevent the second conductive member 410 in the second hole from coming into contact with the positive capacitor layer 100 and causing a short circuit, the second conductive member 410 may be isolated from the positive capacitor layer 100 through which the first hole runs. In an embodiment, a hole is formed at a position of the negative capacitor layer 200 through which the second hole runs. In this case, this hole may be set relatively large, that is, an aperture of this hole is greater than that of the second hole. In this way, the second conductive member 410 located in the second hole is isolated from the positive capacitor layer 100 (e.g., not in contact with the positive capacitor layer 100).

In this embodiment, a structure of the positive input terminal 500 is as follows. The positive input terminal 500 runs through the bus capacitor along the thickness direction, and two opposite ends of the positive input terminal 500 along the thickness direction are exposed outside the insulation housing 600. A structure of the negative input terminal 510 is as follows. The negative input terminal 510 runs through the bus capacitor along the thickness direction, and two opposite ends of the negative input terminal 510 along the thickness direction are exposed outside the insulation housing 600. A positive input hole 501 is provided/disposed running through the positive input terminal 500 along the thickness direction. A negative input hole 511 is provided/disposed running through the negative input terminal 510 along the thickness direction.

In this embodiment, a structure of the positive output terminal 520 is as follows. The positive output terminal 520 runs through the bus capacitor along the thickness direction, and two opposite ends of the positive output terminal 520 along the thickness direction are exposed outside the insulation housing 600. A structure of the negative output terminal 530 is as follows. The negative output terminal 530 runs through the bus capacitor along the thickness direction, and two opposite ends of the negative output terminal 530 along the thickness direction are exposed outside the insulation housing 600. A positive output hole 521 is provided/disposed running through the positive output terminal 520 along the thickness direction. A negative output hole 531 is provided/disposed running through the negative output terminal 530 along the thickness direction.

Regarding the positive output terminal 520 of this structure and the negative output terminal 530 of this structure, a positive connection terminal 710 of the power module 700 is a positive terminal hole provided in the power module 700, and a negative connection terminal 720 of the power module 700 is a negative terminal hole provided in the power module 700. During connection of the bus capacitor and the power module 700, a conductive fastening rod 730 is inserted into the positive output hole 521 and the positive terminal hole. The positive terminal hole may be a threaded hole, and the conductive fastening rod 730 may be a fastening bolt. The fastening bolt is tightened in the threaded hole to connect the power module 700 to the bus capacitor. Similarly, another conductive fastening rod 730 is inserted into the negative output hole 531 and the negative terminal hole. The negative terminal hole may be a threaded hole, and the conductive fastening rod 730 may be a fastening bolt. The fastening bolt is tightened in the threaded hole to connect the power module 700 to the bus capacitor. In this way, both mechanical connection and electrical connection can be achieved, and the power module 700 and the bus capacitor are in zero-distance contact. This can reduce a stray inductance, thereby relieving impact of the stray inductance on components, allowing an advantage of a fast switch-on/off speed of an MOSFET to be fully utilized, that is, allowing performance of SiC in an MOSFET device to be fully utilized.

Figures 9, 10:
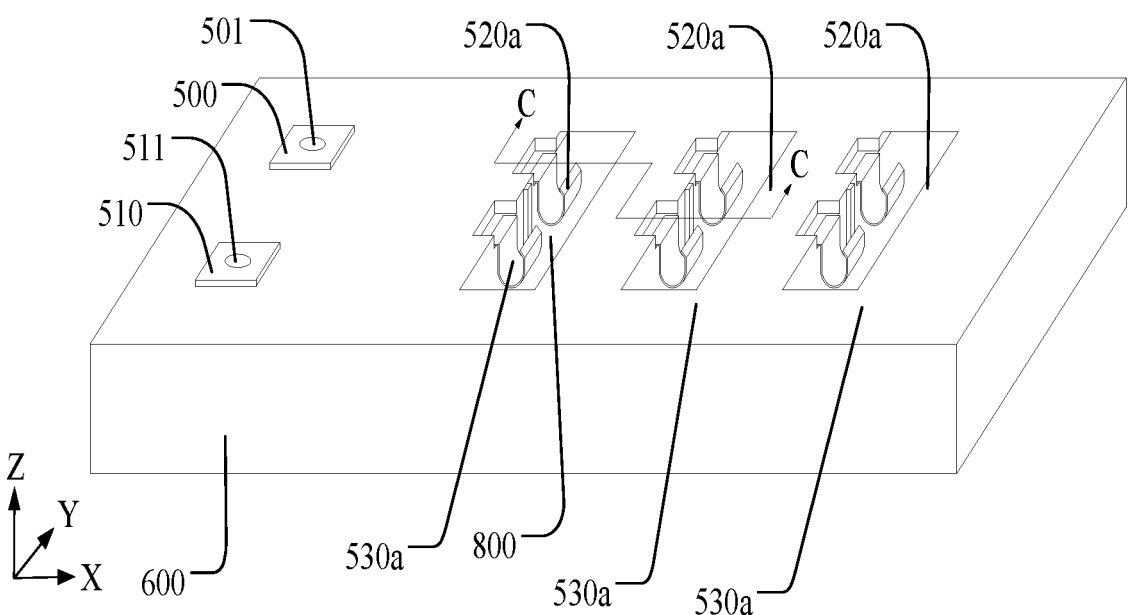
FIG. 9 is a schematic structural diagram of a bus capacitor according to another embodiment of the present disclosure.
FIG. 10 a cross-sectional view of the bus capacitor along line C-C in FIG. 9.

Refer to FIG. 9 and FIG. 10. FIG. 9 is a schematic structural diagram of a bus capacitor according to another embodiment of the present disclosure. FIG. 10 a cross-sectional view of the bus capacitor along line C-C in FIG. 9. Some embodiments of the present disclosure provide a bus capacitor. Differences between the bus capacitor and the foregoing embodiment lie in that the positive output terminal 520*a* is in a shape of a curved sheet, and the negative output terminal 530*a* is in a shape of a curved sheet; and a mounting hole 800 is provided running through the bus capacitor along the thickness direction thereof, and both the positive output terminal 520*a* and the negative output terminal 530*a* are provided in the mounting hole 800. In addition, the positive output terminal 520*a* and the negative output terminal 530*a* are located on a same side of the mounting hole 800.

In an embodiment, both the positive output terminal 520*a* and the negative output terminal 530*a* may be U-shaped. Using a direction in the figure as a reference, an opening of the output terminal is upward, and one side of the output terminal is connected to a side wall of a mounting hole 800. The side wall of the mounting hole 800 is formed at a position where the capacitor layer and the dielectric 300 are exposed to the mounting hole 800. It can be understood that in the side wall of the mounting hole 800, only the positive capacitor layer 100 is exposed at a connection with the positive output terminal 520*a*, and only the negative capacitor layer 200 is exposed at a connection with the negative output terminal 530*a*, thereby preventing a short circuit from occurring.

When the bus capacitor of this structure is connected to the power module, the power module is correspondingly provided with a plug-in rod with a positive connection terminal and a negative connection terminal. The plug-in rod is inserted into the mounting hole 800, and the positive connection terminal abuts against the positive output terminal and the negative connection terminal abuts against the negative output terminal. This enables zero-distance electrical connection between the bus capacitor and the power module to reduce the stray inductance.

The positive output terminals 520*a* and the negative output terminals 530*a* are located on the same side of the mounting hole 800. Therefore, correspondingly, the positive connection terminals and the negative connection terminals may be distributed along a same side of the mounting hole 800 of the bus capacitor, that is, a width direction of the bus capacitor in the figure. This facilitates the arrangement/ configuration of the positive output terminals 520*a* and the negative output terminals 530*a*.

Figure 11:
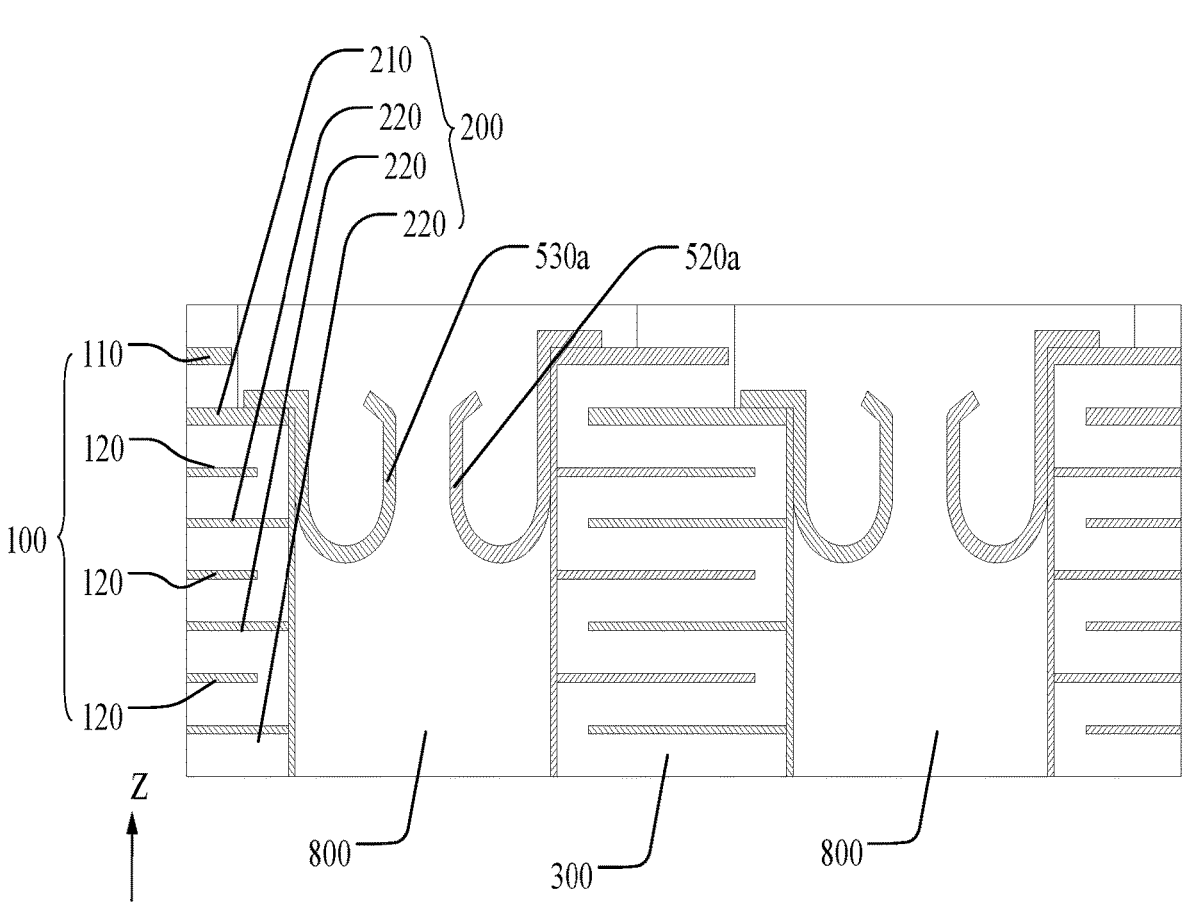
FIG. 11 is a schematic structural diagram of a bus capacitor according to another embodiment of the present disclosure.
Figure 12:
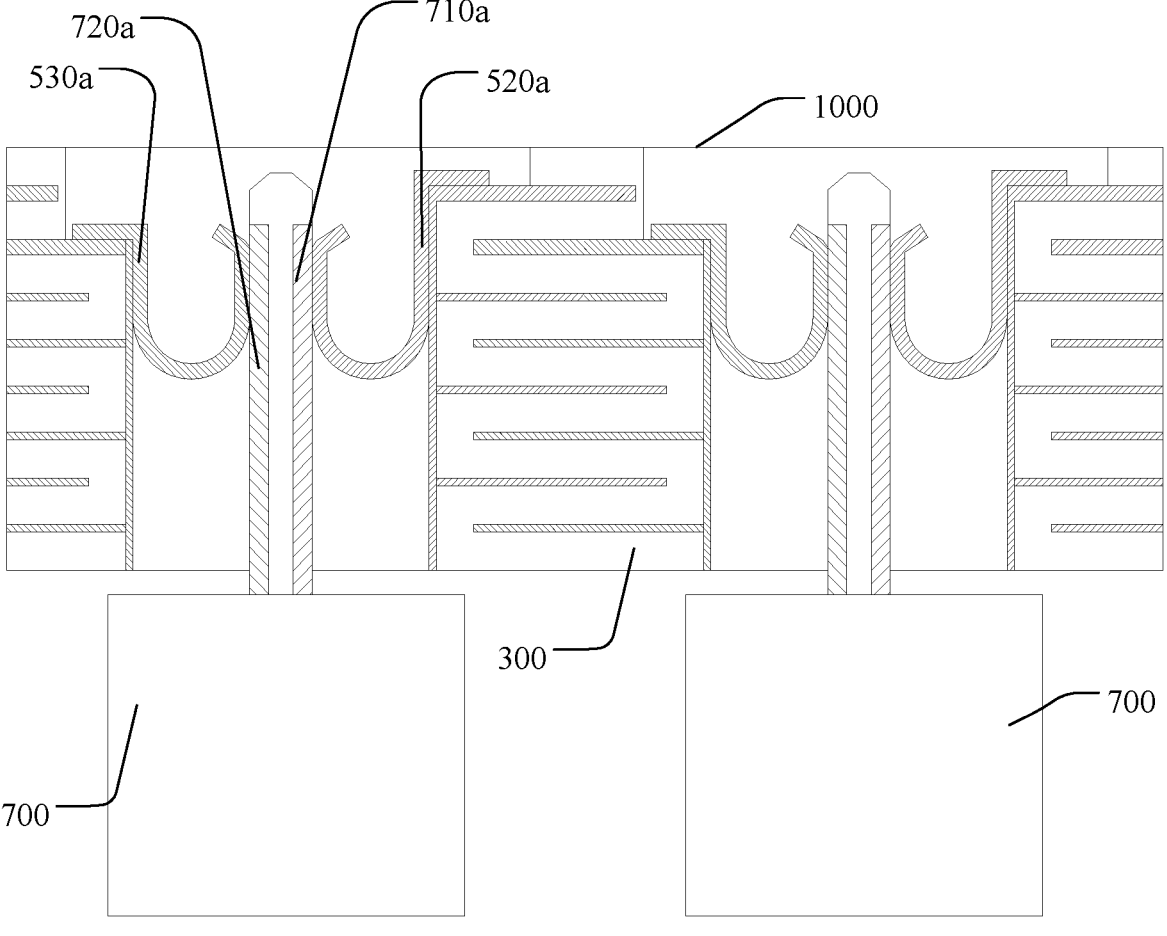
FIG. 12 is a schematic structural diagram of cooperation between the bus capacitor shown in FIG. 11 and a power module.

Refer to FIG. 11 and FIG. 12. FIG. 11 is a schematic structural diagram of a bus capacitor according to another embodiment of the present disclosure. FIG. 12 is a schematic structural diagram of cooperation between the bus capacitor shown in FIG. 11 and a power module. Differences between this bus capacitor and the bus capacitor provided in the foregoing embodiment lie in that the positive output terminal 520*a* and the negative output terminal 530*a* are located on different sides of the mounting hole 800. It can be seen from the figure that, the positive output terminal 520*a* is located on a right side of the mounting hole 800, and the negative output terminal 530*a* is located on a left side of the mounting hole 800. Correspondingly, the positive connection terminal 710*a* and the negative connection terminal 720*a* may be distributed along two sides (e.g., the left side and the right side) of the mounting hole 800 of the bus capacitor, that is, a length direction of the bus capacitor in the figure. In this way, the positive output terminal 520*a* and the negative output terminal 530*a* can tightly clamp a plug-in rod of the power module 700 to achieve mechanical connection and electrical connection, with a sample and reliable structure and strong stability.

Figure 13:
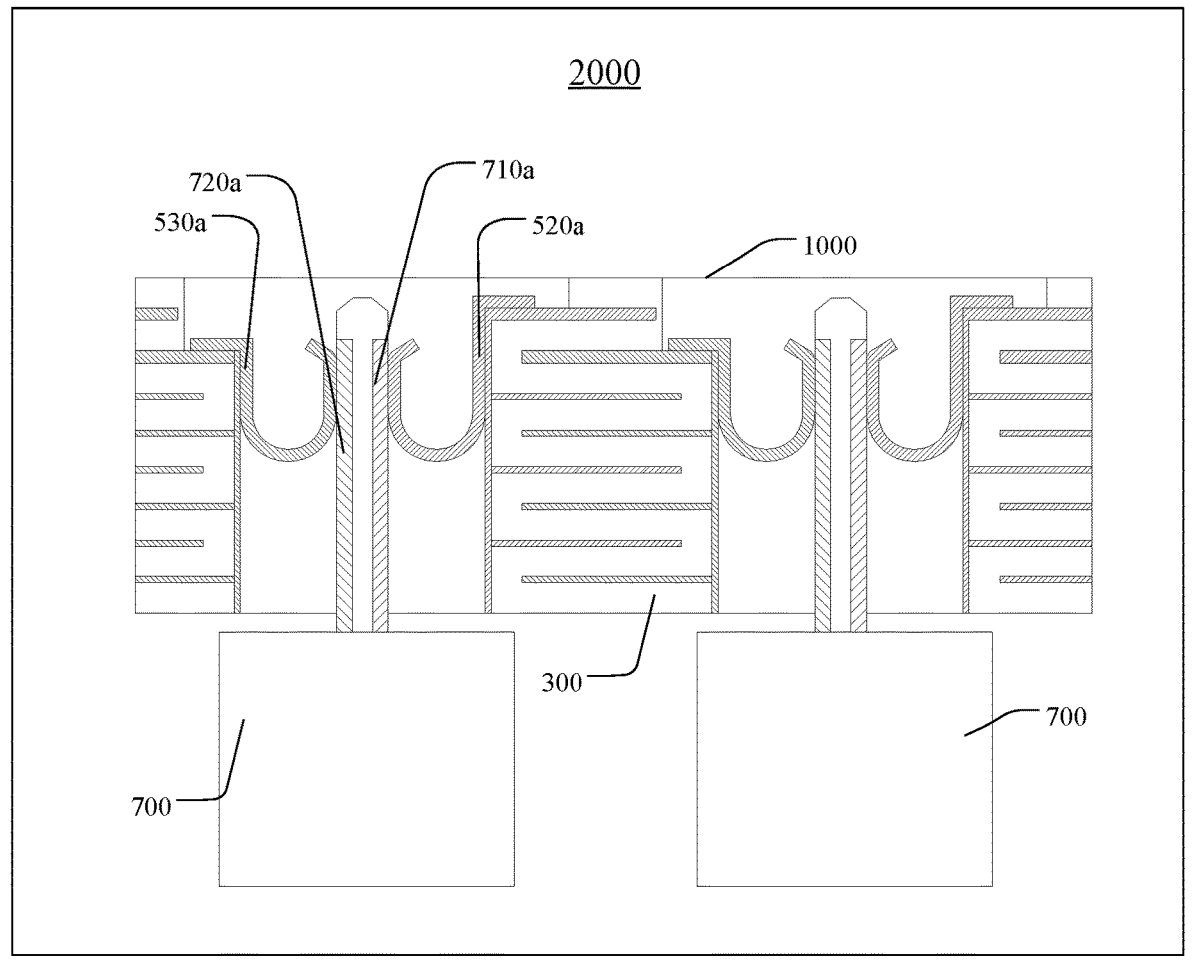
FIG. 13 is a schematic structural diagram of an automobile according to an embodiment of the present disclosure.

FIG. 13 is a schematic structural diagram of an automobile according to an embodiment of the present disclosure. In some embodiments, the automobile includes the bus capacitor described above and at least one power module coupled to the bus capacitor. The power module is provided with a positive connection terminal and a negative connection terminal. The positive connection terminal is connected to the positive capacitor layer of the bus capacitor. The negative connection terminal is connected to the negative capacitor layer of the bus capacitor. It should be noted that, FIG. 13 shows the cooperation between the bus capacitor and the power module in the automobile. In the present disclosure, other forms of cooperation between the bus capacitor and the power module in the automobile may be further obtained according to other types of structures of the bus capacitor. Details are not described herein.

The embodiments of the present disclosure are described in detail above. Although the principles and implementations of the present disclosure are described by using examples in this specification, the descriptions of the foregoing embodiments can be intended to help understand the method and the core idea of the method of the present disclosure.

What is claimed is:

1. A bus capacitor, comprising:

a plurality of capacitor layers stacked along a thickness direction of the bus capacitor, a dielectric being filled between two adjacent capacitor layers, and the capacitor layers comprising a plurality of positive capacitor layers and a plurality of negative capacitor layers;

a first hole extending along the thickness direction, and the first hole running through the positive capacitor layers and encapsulated in the bus capacitor; and a first conductive member being disposed in the first hole and encapsulated in the bus capacitor, two ends of the first conductive member respectively abutting against two of the positive capacitor layers, and the first conductive member being in contact with the positive capacitor layers to electrically connect the positive capacitor layers with each other; and a second hole extending along the thickness direction, and the second hole running through the negative capacitor layers and encapsulated in the bus capacitor; and a second conductive member being disposed in the second hole and encapsulated in the bus capacitor, two ends of the second conductive member respectively abutting against two of the negative capacitor layers, and the second conductive member being in contact with the negative capacitor layers to electrically connect the negative capacitor layers with each other, wherein the positive capacitor layers comprise a first positive electrode layer and a second positive electrode layer, and the negative capacitor layers comprise a first negative electrode layer and a second negative electrode layer;

wherein the bus capacitor further comprises a positive input terminal, a negative input terminal, a positive output terminal, and a negative output terminal, the positive input terminal is in contact with the first positive electrode layer to electrically connect the positive input terminal to the first positive electrode layer; the negative input terminal is in contact with the first negative electrode layer to electrically connect the negative input terminal to the first negative electrode layer, the positive output terminal is in contact with the positive capacitor layers to electrically connect the positive output terminal to the positive capacitor layers, and the negative output terminal is in contact with the negative capacitor layers to electrically connect the negative output terminal to the negative capacitor layers.

2. The bus capacitor according to claim 1, wherein the first conductive member comprises a first conductive rod disposed into the first hole, and the second conductive member comprises a second conductive rod disposed into the second hole.

3. The bus capacitor according to claim 1, wherein the first conductive member comprises a first conductive layer coated on an inner wall of the first hole, and the second conductive member comprises a second conductive layer coated on an inner wall of the second hole.

4. The bus capacitor according to claim 1, wherein:

the positive capacitor layers and the negative capacitor layers are alternately stacked along the thickness direction;

the first hole runs through the negative capacitor layers, one of the negative capacitor layers is sandwiched between two adjacent positive capacitor layers, and the first conductive member is isolated from the negative capacitor layers; and the second hole runs through the positive capacitor layers, one of the positive capacitor layers is sandwiched between two adjacent negative capacitor layers, and the second conductive member is isolated from the positive capacitor layers.

5. The bus capacitor according to claim 1, further comprising:

a plurality of first holes including the first hole and extending along the thickness direction; a plurality of second holes including the second hole and extending along the thickness direction;

a plurality of first conductive members including the first conductive member and disposed in the first holes to electrically connect the positive capacitor layers at first locations; and a plurality of second conductive members including the second conductive member and disposed in the second holes to electrically connect the negative capacitor layers at second locations.

6. The bus capacitor according to claim 1, wherein:

a thickness of the first positive electrode layer is greater than a thickness of the second positive electrode layer; and a thickness of the first negative electrode layer is greater than a thickness of the second negative electrode layer.

7. The bus capacitor according to claim 1, further comprising an insulation housing, wherein:

the capacitor layers are disposed inside the insulation housing;

the positive input terminal runs through the bus capacitor along the thickness direction, and two opposite ends of the positive input terminal along the thickness direction are exposed outside the insulation housing; the negative input terminal runs through the bus capacitor along the thickness direction, and two opposite ends of the negative input terminal along the thickness direction are exposed outside the insulation housing; and a positive input hole runs through the positive input terminal along the thickness direction, and a negative input hole runs through the negative input terminal along the thickness direction.

8. The bus capacitor according to claim 1, further comprising an insulation housing, wherein:

the capacitor layers are disposed inside the insulation housing; and the positive output terminal runs through the bus capacitor along the thickness direction, and two opposite ends of the positive output terminal along the thickness direction are exposed outside the insulation housing; the negative output terminal runs through the bus capacitor along the thickness direction, and two opposite ends of the negative output terminal along the thickness direction are exposed outside the insulation housing; and a positive output hole runs through the positive output terminal along the thickness direction, and a negative output hole runs through the negative output terminal along the thickness direction.

9. The bus capacitor according to claim 1, further comprising an insulation housing, wherein the capacitor layers are disposed inside the insulation housing.

10. The bus capacitor according to claim 1, wherein:

the positive output terminal is in a shape of a first curved sheet, and the negative output terminal is in a shape of a second curved sheet; and a mounting hole runs through the bus capacitor along the thickness direction, and the positive output terminal and the negative output terminal are disposed inside the mounting hole.

11. The bus capacitor according to claim 1, wherein a connection line between the positive input terminal and the positive output terminal intersects a connection line between the negative input terminal and the negative output terminal.

12. The bus capacitor according to claim 1, wherein:

the positive capacitor layers comprise a plurality of second positive electrode layers including the second positive electrode layer;

the negative capacitor layers comprise a plurality of second negative electrode layers including the second negative electrode layer; and a number of the second positive electrode layers is equal to a number of the second negative electrode layers.

13. The bus capacitor according to claim 1, further comprising a positive input terminal and a negative input terminal, wherein:

the positive input terminal is electrically connected to the second positive electrode layer; and the negative input terminal is electrically connected to the second negative electrode layer.

14. An automobile, comprising:

a bus capacitor; and a power module, the power module comprising a positive connection terminal and a negative connection terminal, wherein the bus capacitor comprises:

a plurality of capacitor layers stacked along a thickness direction of the bus capacitor, a dielectric being filled between two adjacent capacitor layers, and the capacitor layers comprising a plurality of positive capacitor layers and a plurality of negative capacitor layers;

a first hole extending along the thickness direction, and the first hole running through the positive capacitor layers and encapsulated in the bus capacitor; and a first conductive member being disposed in the first hole and encapsulated in the bus capacitor, two ends of the first conductive member respectively abutting against two of the positive capacitor layers, and the first conductive member being in contact with the positive capacitor layers to electrically connect the positive capacitor layers with each other; and a second hole extending along the thickness direction, and the second hole running through the negative capacitor layers and encapsulated in the bus capacitor; and a second conductive member being disposed in the second hole and encapsulated in the bus capacitor, two ends of the second conductive member respectively abutting against two of the negative capacitor layers, and the second conductive member being in contact with the negative capacitor layers to electrically connect the negative capacitor layers with each other; and the positive connection terminal is connected to the positive capacitor layers of the bus capacitor, and the negative connection terminal is connected to the negative capacitor layers of the bus capacitor, wherein the positive capacitor layers comprise a first positive electrode layer and a second positive electrode layer, and the negative capacitor layers comprise a first negative electrode layer and a second negative electrode layer;

wherein the bus capacitor further comprises a positive input terminal, a negative input terminal, a positive output terminal, and a negative output terminal, the positive input terminal is in contact with the first positive electrode layer to electrically connect the positive input terminal to the first positive electrode layer;

the negative input terminal is in contact with the first negative electrode layer to electrically connect the negative input terminal to the first negative electrode layer, the positive output terminal is in contact with the positive capacitor layers to electrically connect the positive output terminal to the positive capacitor layers, and the negative output terminal is in contact with the negative capacitor layers to electrically connect the negative output terminal to the negative capacitor layers.

15. The automobile according to claim 14, wherein the first conductive member comprises a first conductive rod disposed into the first hole, and the second conductive member comprises a second conductive rod disposed into the second hole.

16. The automobile according to claim 14, wherein the first conductive member comprises a first conductive layer coated on an inner wall of the first hole, and the second conductive member comprises a second conductive layer coated on an inner wall of the second hole.

17. The automobile according to claim 14, wherein:
the positive capacitor layers and the negative capacitor layers are alternately stacked along the thickness direction;
the first hole runs through the negative capacitor layers, one of the negative capacitor layers is sandwiched between two adjacent positive capacitor layers, and the first conductive member is isolated from the negative capacitor layers; and
the second hole runs through the positive capacitor layers, one of the positive capacitor layers is sandwiched between two adjacent negative capacitor layers, and the second conductive member is isolated from the positive capacitor layers.

18. The automobile according to claim 14, the bus capacitor further comprises:
a plurality of first holes including the first hole and extending along the thickness direction; a plurality of second holes including the second hole and extending along the thickness direction;
a plurality of first conductive members including the first conductive member and disposed in the first holes to electrically connect the positive capacitor layers at first locations; and
a plurality of second conductive members including the second conductive member and disposed in the second holes to electrically connect the negative capacitor layers at second locations.

19. The automobile according to claim 14, wherein:
a thickness of the first positive electrode layer is greater than a thickness of the second positive electrode layer; and
a thickness of the first negative electrode layer is greater than a thickness of the second negative electrode layer.

* * * * *